US010065865B2

(12) United States Patent
Fuhrmann et al.

(10) Patent No.: US 10,065,865 B2
(45) Date of Patent: Sep. 4, 2018

(54) PROCESS FOR PREPARING AQUEOUS COLLOIDAL SILICA SOLS OF HIGH PURITY FROM ALKALI METAL SILICATE SOLUTIONS

(75) Inventors: Claudia Fuhrmann, Meckenheim (DE); Dieter Oehm, Bad Honnef (DE); Christian Panz, Wesselng-Berzdorf (DE); Florian Paulat, Marne (DE); Rüdiger Schütte, Alzenau-Hörstein (DE); Hartwig Rauleder, Rheinfelden (DE); Georg Markowz, Alzenau (DE); Jürgen Erwin Lang, Karlsruhe (DE); Bodo Frings, Schloss Holte (DE)

(73) Assignee: Evonik Degussa GmbH, Essen (DE)

( * ) Notice: Subject to any disclaimer, the term of this patent is extended or adjusted under 35 U.S.C. 154(b) by 953 days.

(21) Appl. No.: 14/000,930

(22) PCT Filed: Feb. 9, 2012

(86) PCT No.: PCT/EP2012/052199
§ 371 (c)(1),
(2), (4) Date: Oct. 29, 2013

(87) PCT Pub. No.: WO2012/113650
PCT Pub. Date: Aug. 30, 2012

(65) Prior Publication Data
US 2014/0042359 A1 Feb. 13, 2014

(30) Foreign Application Priority Data

Feb. 22, 2011 (DE) .......................... 10 2011 004 534
Apr. 29, 2011 (DE) .......................... 10 2011 017 783

(51) Int. Cl.
*C01B 33/14* (2006.01)
*C09G 1/02* (2006.01)
*C01B 33/143* (2006.01)
*C01B 33/148* (2006.01)
*C01B 33/193* (2006.01)
*C09K 3/14* (2006.01)
*C01B 33/12* (2006.01)

(52) U.S. Cl.
CPC .......... *C01B 33/1435* (2013.01); *C01B 33/12* (2013.01); *C01B 33/1485* (2013.01); *C01B 33/193* (2013.01); *C09G 1/02* (2013.01); *C09K 3/1463* (2013.01)

(58) Field of Classification Search
CPC . C01B 33/1435; C01B 33/12; C01B 33/1485; C01B 33/193; C09G 1/02; C09K 3/1463
USPC .................. 516/81; 423/335; 252/79.1
See application file for complete search history.

(56) References Cited

U.S. PATENT DOCUMENTS

| | | | |
|---|---|---|---|
| 3,884,835 A | 5/1975 | Vaughan | |
| 4,372,858 A | 2/1983 | Ritter | |
| 4,857,290 A * | 8/1989 | Shimizu | C01B 33/1485 423/335 |
| 5,100,581 A * | 3/1992 | Watanabe | C01B 33/148 106/287.34 |
| 5,230,833 A * | 7/1993 | Romberger | C01B 33/1435 252/363.5 |
| 6,440,856 B1 | 8/2002 | Bessho et al. | |
| 9,028,572 B2 * | 5/2015 | Grumbine | B24B 37/044 51/307 |
| 9,598,611 B2 * | 3/2017 | Nakayama | C01B 33/1435 |
| 2007/0254964 A1 | 11/2007 | Mahulikar et al. | |
| 2009/0223136 A1 | 9/2009 | Nakajo et al. | |
| 2011/0236288 A1 * | 9/2011 | Panz | C01B 33/193 423/335 |
| 2014/0072803 A1 | 3/2014 | Panz et al. | |
| 2014/0079620 A1 | 3/2014 | Panz et al. | |
| 2016/0207785 A1 * | 7/2016 | Panz | C01B 33/193 |
| 2017/0051181 A1 * | 2/2017 | Grumbine | B24B 37/044 |
| 2017/0066654 A1 * | 3/2017 | Panz | C01B 33/128 |

FOREIGN PATENT DOCUMENTS

| | | | |
|---|---|---|---|
| EP | 0 464 289 A2 * | 1/1992 | |
| EP | 0537375 | 4/1993 | |
| EP | 0571317 | 11/1993 | |
| JP | 08-11688 B * | 2/1996 | |
| JP | 2003-089786 A * | 3/2003 | |
| JP | 3691047 B2 | 8/2005 | |
| JP | 2006-36612 A * | 2/2006 | |
| WO | 03078321 | 9/2003 | |
| WO | WO 2009/155714 A1 * | 12/2009 | |

(Continued)

OTHER PUBLICATIONS

Machine Translation of Publ. No. JP 2006-036612 A, published Feb. 2006, Japan Patent Office, Tokyo, Japan, online at https://dossier1.j-platpat.inpit.go.jp/tri/all/odse/ODSE_GM101_Top.action (Downloaded Mar. 16, 2016), pp. 1-15.*

Machine Translation of Publ. No. JP 2003-089786 A, published Mar. 2003, Japan Patent Office, Tokyo, Japan, online at https://dossier1.j-platpat.inpit.go.jp/tri/all/odse/ODSE_GM101_Top.action (Downloaded Mar. 16, 2016), pp. 1-12.*

Machine Translation of Publ. No. WO2009155714, published Dec. 2009, World Intellectual Property Organization Patentscope, Geneva, Switzerland, obtained online @ http://patentscope.wipo.int/search/en/search.jsf (Downloaded Mar. 16, 2016), pp. 1-23.*

Machine Translation of Publ. No. JP 08-11688 B, published Feb. 1996, Japan Patent Office, Tokyo, Japan, online at https://dossier1.j-platpat.inpit.go.jp/tri/all/odse/ODSE_GM101_Top.action (Downloaded May 5, 2016), pp. 1-8.*

(Continued)

*Primary Examiner* — Daniel S Metzmaier
(74) *Attorney, Agent, or Firm* — Michael Best & Friedrich LLP

(57) ABSTRACT

The present invention relates to a process for preparing aqueous colloidal silica sols of high purity from silicate solutions, to aqueous colloidal silica sols with a specific profile of impurities, and to the use thereof. The invention further encompasses high-purity aqueous silica obtained as an intermediate in the course of the purification process, high-purity silicon dioxide obtainable by dewatering, and the use thereof.

8 Claims, 2 Drawing Sheets

(56) References Cited

FOREIGN PATENT DOCUMENTS

| | | |
|---|---|---|
| WO | 2010037702 | 4/2010 |
| WO | 2010037705 | 8/2010 |

OTHER PUBLICATIONS

Derwent Abstract on EAST, week Oct. 1996, London: Derwent Publications Ltd., AN 1989-043149, Class A60, JP 63315514 A & JP 96011688 B2, (Fuji Davison Chem Ltd), abstract, pp. 1-3.*
Huggins, "The Crystal Structure of Quartz", Physical Review, vol. 19, No. 4, Apr. 1, 1922, pp. 363-368.
Le Page et al, "Refinement of the Crystal Structure of Low-Quartz", Acta Cryst., vol. B32, No. 8, Aug. 31, 1976, pp. 2456-2459.
International Search Report and Written Opinion, PCT/EP2012/052199, dated Oct. 4, 2012.
United States Patent Office Action for U.S. Appl. No. 14/000,934 dated Oct. 7, 2014 (14 pages).

\* cited by examiner

US 10,065,865 B2

PROCESS FOR PREPARING AQUEOUS COLLOIDAL SILICA SOLS OF HIGH PURITY FROM ALKALI METAL SILICATE SOLUTIONS

CROSS-REFERENCE TO RELATED APPLICATIONS

This patent application is a national stage filing under 35 U.S.C. 371 of International Application No. PCT/EP2012/052199, filed on Feb. 9, 2012, which claims the benefit of priority to German Patent Application No. 102011004534.1, filed on Feb. 22, 2011, and German Patent Application No. 102011017783.3, filed on Apr. 29, 2011, the disclosures of which are incorporated by reference herein in their entireties. Priority to each application is hereby claimed.

FIELD OF THE INVENTION

The present invention relates to a process for preparing aqueous colloidal silica sols of high purity from silicate solutions, to aqueous colloidal silica sols with a specific profile of impurities, and to the use thereof. The invention further encompasses high-purity aqueous silica obtained as an intermediate in the course of the purification process, high-purity silicon dioxide obtainable by dewatering, and the use thereof.

BACKGROUND

Colloidal silica sols are obtained industrially principally from waterglass, which is an inexpensive raw material. Waterglass is typically obtained by melting quartz sand together with soda or potash at temperatures around 1200° C. and then dissolving the quenched alkali metal silicate in water under pressure and elevated temperature.

In the customary process for preparing colloidal silica sols proceeding from waterglass, the latter is first treated with an acidic cation exchanger of the hydrogen type (cf., for example, "Colloidal Silica—Fundamentals and Applications", Editors: H. E. Bergma, W. O. Roberts, CRC Press, 2006, ISBN: 0-8247-0967-5). The resulting silica having a pH of 2-4 is subsequently stabilized at a pH of 8-10 by alkalizing and heated to temperatures in the range of 80-100° C. to form particles. Suitable selection of the process parameters allows mean particle sizes in the range from 5 nm to about 200 nm to be established and the particle size distribution to be controlled.

As a result of the low purity of the starting materials, the colloidal silica sols prepared by this process, however, contain impurities, especially in the form of alkali metals and alkaline earth metals such as Na, K, Mg and Ca, and of transition metals such as Al, Fe, Cr, Ni, Cu and Zr in concentrations up to 1000 ppm, and the metals may be present in elemental form, in ionic form and/or as compounds, summarized hereinafter by the term "metal-based impurities (of metal x)". Content figures for metal-based impurities, unless stipulated otherwise, are based here on the content of a metal/group of metals taking account of presence in elemental and ionic form and in the form of compounds in the possibly dissolved or dispersed $SiO_2$-based solids, expressed in parts by weight (ppm) of the metallic element(s) in question. Particular applications, especially as an abrasive in chemomechanical polishing (CMP) processes which are used in the semiconductor and electronics industry to polish wafers of high-purity silicon, semiconductor materials and components, magnetic storage media and crystal substrates, in contrast, require high-purity colloidal silica sols which are essentially free of the impurities mentioned above.

In the chemomechanical polishing operation, the material is removed by a combination of a chemical etching operation of the polishing composition formulation and mechanical removal of the surface by the colloidal particles. Metal-based impurities of the colloidal silica sol used as an abrasive lead in this case to unwanted, disruptive effects which can severely impair the quality and functionality of the treated semiconductor material/product. For example, it is known that $Na^+$ and $K^+$ ions possess high mobility in semiconductor materials and can thus diffuse deep into the semiconductor material on contact of the polishing composition formulation with the semiconductor surface, as a result of which the electronic material properties change. On the other hand, Cu-based impurities have, for example, the pronounced property of enrichment at the treated semiconductor surface, as a result of which electrical short-circuit paths can be formed. Higher valency metal impurities, for example Al, Fe or Zr, can lead to increased scratch formation in the course of polishing. The reasons are yet to be clarified unambiguously, but it is possible, for example, that these impurities lead to the formation of larger particles (agglomeration or aggregation) which then correspondingly lead to scratch formation.

Processes for preparing a high-purity colloidal silica sol essentially free of metal-based impurities are already known. Ultrapure colloidal silica sols can be obtained, for example, via a sol-gel process by $NH_4OH$-catalysed hydrolysis and condensation of an organic silane such as tetramethoxysilane (TMOS) or tetraethoxysilane (TEOS) in alcoholic solution (cf., for example, "Colloidal Silica—Fundamentals and Applications", Editors: H. E. Bergma, W. O. Roberts, CRC Press, 2006, ISBN: 0-8247-0967-5). The colloidal silicas sols obtained in this way are notable, based on the very high purity of the starting materials, for very small amounts of metal-based impurities (ppb range). However, particular disadvantages are the high costs of the starting materials and residues of ammonia and organic solvent, which are undesirable for CMP applications.

The process explained in U.S. patent application Ser. No. 11/818,730, published as U.S. Patent Publication No. 2007/0254964 A1 for preparation of a high-purity colloidal silica sol (metal-based impurities in the range of 5-200 ppb, except Na at <1 ppm) is based on the use of a high-purity starting material, in this case fumed silicon dioxide. According to this, the fumed silicon dioxide is dissolved in aqueous alkali metal hydroxide solution, the alkali metal content is removed by means of an acidic cation exchanger and then particle formation is initiated by adjusting the temperature, the pH and the concentration of the silica solution. The fumed silicon dioxide used can be obtained, for example, by hydrolysing $SiCl_4$ in an $H_2/O_2$ flame in an apparatus with a metal-free surface having an impurity content of <100 ppb (EP 1503957 A1). In addition to the complexity of the above-described sol preparation route, a disadvantage is again the use of comparatively costly starting materials.

There has thus been no lack of attempts in the past to develop processes for preparing colloidal silica sols in a purity sufficient for CMP applications (content of metal-based impurities in the low ppm range) based on the purification of technical alkali metal silicate solutions, especially waterglass, as a much less expensive raw material source. Typically, the aqueous alkali metal silicate solution, in a first step for removal of the alkali metal ions from the solution, is contacted with an acidic cation exchanger of the hydrogen type.

JP 2003-089786 A proposes, for example, a process for preparing a colloidal silica sol with a low content of metal-based impurities (alkali metal≤50 ppm; Cu<100 ppb; Zn<1000 ppb; Ca≤7 ppm, Mg≤10 ppm, Fe≤13 ppm) by purifying a 3-10% by weight aqueous alkali metal silicate solution. In this process, the aqueous alkali metal silicate solution is first contacted with an acidic cation exchanger of the hydrogen type to remove the content of metal-based impurities of alkali metals, then metal-based impurities of polyvalent metals are removed from the resulting silica solution with a pH in the range of 2-6 by passing it over a resin with chelate-forming functional groups and then alkalizing it with an amine or quaternary ammonium hydroxide to a pH of >8 at a temperature of 95-100° C. to induce formation of colloidal particles with a final particle diameter in the range of 5-150 nm. Optionally, the sol formation may be preceded by addition of oxidizing agents and/or soluble chelating agents, the latter serving, in the course of the final concentration of the sol by means of ultrafiltration to $SiO_2$ content 10-60% by weight, to remove metal-based impurities in the form of water-soluble chelate complexes. The purity with regard to metal-based impurities of individual metals achievable by means of this process, especially of higher valency metals such as Zr and Al for example, is, however, considered to be inadequate for CMP applications.

The process described in EP 0537375 A1 for preparing aqueous colloidal silica sols of high purity proceeds from an aqueous alkali metal silicate solution in a concentration of 1-6% by weight as $SiO_2$, which contains a content of metal-based impurities of 300-10 000 ppm. This is likewise passed in a first step over an acidic cation exchanger of the hydrogen type to remove the content of metal-based impurities of alkali metals, with an optional downstream anion exchange with a basic anion exchanger of the hydroxyl type. The resulting active silica solution (pH: 2-4) is adjusted to a pH of 0 to 2 by adding a strong acid and kept at a constant temperature in the range of 0-100° C. for a period of 0.1-120 h before it is contacted first with an acidic cation exchanger of the hydrogen type and then with a basic anion exchanger of the hydroxyl type to remove metal-based impurities and counterions introduced with the acid. To initiate particle growth, the resulting purified silica is subsequently introduced into a high-purity aqueous alkali metal silicate or alkali metal hydroxide solution heated to 60-150° C. over a period of 1-20 h until a molar $SiO_2/M_2O$ ratio (M: alkali metal) in the range of 30-300 has been established. After ageing at a given temperature for a further 0.1-10 h, the stable sol formed with mean particle sizes in the range of 10-30 nm is concentrated to 30-50% by weight of $SiO_2$ by means of a microporous membrane and then contacted in a final purification step first with an acidic cation exchanger of the hydrogen type, then with a basic anion exchanger of the hydroxyl type and subsequently with a further acidic cation exchanger of the hydrogen type. After final stabilization by adding ammonia, an aqueous silica sol (pH: 8-10.5) with a total content of metal-based impurities of polyvalent metals<300 ppm is obtained in this way. The content of metal-based impurities of alkali metals is, however, much too high for CMP applications at >800 ppm based on the $SiO_2$ content of the sol.

JP 2006-036612 A describes a method for preparing high-purity aqueous silica solutions from aqueous alkali metal silicate solutions with a starting content of metal-based impurities of polyvalent metals in the range of approx. 100-40 000 ppm based on the addition of a water-soluble nitrogen- or phosphorus-containing chelating agent which forms anionic metal complexes with the metal-based impurities. These are removed from the solution by contact with a basic anion exchanger of the hydroxyl type—after an intermediate process step for removal of the alkali metal cations by ion exchange with an acidic cation exchanger of the hydrogen type. While the process enables a distinct reduction in the content of metal-based impurities of Zn by a factor of >18, the purifying effect with regard to the metal-based impurities of further elements (Cu, Mn, Ni and Fe) is much lower, and so a further purification before a step of colloid particle growth would be indispensible for CMP applications.

WO 2010/037702 A1 and WO 2010/037705 A1 describe processes for preparing high-purity solid $SiO_2$ from silicate solutions by precipitation reaction. In this case, aqueous alkali metal silicate solution is added dropwise to an initial charge of a strong acid used in excess, and the pH should be kept within the range from 0 to less than 2 over the entire process. The shock-like transfer into the acidic medium leads to rapid gelation at the droplet shell, such that particles of good filterability with dimensions in the $d_{50}$ range of 0.1-10 mm are precipitated, which can have different characteristic shapes depending on the solution viscosity and drop rate. The very low pH ensures that ideally no free negatively charged SiO groups, which can lead to the binding of troublesome metal ions, are present at the surface of the silica. The metal ions which are thus present in dissociated form can therefore be removed effectively from the precipitated silica by washing the filter cake. The silicon dioxide obtained after drying is notable for a comparatively high purity with regard to a broad spectrum of metal-based impurities with a content of Fe, Al, Ti≤5 ppm, of Ca, Ni, Zn≤1 ppm and of alkali metals≤10 ppm, and serves as starting material for the production of solar silicon. In view of the macroscopic particle sizes, this precipitated silica, however, is not immediately suitable for CMP applications.

In view of the deficits of the processes proposed to date, there is still a need for an effective and inexpensive process with a simple process regime for preparing aqueous colloidal silica sols in a purity which meets the requirements of use as an abrasive in chemomechanical polishing (CMP) processes in the semiconductor and electronics industries.

SUMMARY OF THE INVENTION

The technical problem addressed by the present invention was therefore that of providing a process for preparing aqueous colloidal silica sols of high purity, which overcomes the disadvantages of the processes mentioned above or has them only in reduced form. It was a further technical problem to provide an aqueous colloidal silica sol in a purity sufficient for CMP applications.

These problems are solved by the process described in the description which follows, the examples and the claims, and the aqueous colloidal silica sol described therein.

The process of the present invention for preparing an aqueous colloidal silica sol is characterized in that it comprises the following steps:

a. preparing an aqueous solution of a water-soluble alkali metal silicate with a pH of less than 2, preferably less than 1.5, more preferably less than 1, most preferably less than 0.5, by mixing a water-soluble alkali metal silicate or an aqueous alkali metal silicate solution with an acidifier b. contacting the acidic alkali metal silicate solution obtained in process step a) with a basic anion exchange resin of the hydroxyl type and an acidic cation exchange resin of the hydrogen type in any sequence, the anion exchange resin and the cation exchange resin being used in spatial separation or in a mixture c. forming a stable colloidal silica sol by establishing a temperature, concentration and pH suitable for nucleation and particle growth in the aqueous silica solution obtained from step b).

The acidic alkali metal silicate solution prepared in process step a) can optionally be contacted before performance of step b) with a resin containing chelate-forming functional groups with binding affinity to divalent or higher-valency metal ions.

A specific embodiment of the present invention is thus a process for preparing an aqueous colloidal silica sol, which comprises the following steps:

a. preparing an aqueous solution of a water-soluble alkali metal silicate with a pH of less than 2, preferably less than 1.5, more preferably less than 1, most preferably less than 0.5, by mixing a water-soluble alkali metal silicate or an aqueous alkali metal silicate solution with an acidifier a1. contacting the acidic alkali metal silicate solution obtained in process step a) with a resin containing chelate-forming functional groups with binding affinity for divalent or higher-valency metal ions b. contacting the acidic alkali metal silicate solution obtained in process step a1) with a basic anion exchange resin of the hydroxyl type and an acidic cation exchange resin of the hydrogen type in any sequence, the anion exchange resin and the cation exchange resin being used in spatial separation or in a mixture c. forming a stable colloidal silica sol by establishing a temperature, concentration and pH suitable for nucleation and particle growth in the aqueous silica solution obtained from step b).

Furthermore, in all variants of the process, it is optionally possible to implement one or more aging steps before, during or after one or more of process steps a), a1), b) and/or c). An ageing step is understood here to mean a process step in which the aqueous $SiO_2$-containing solution or dispersion is held at constant temperature for a particular time without addition or removal of any substance (ageing). In a particular embodiment of the process according to the invention, for example, the acidic alkali metal silicate solution obtained from process step a) and/or from process step a1) can be aged at a temperature in the range from 10 to 100° C. for a period of 0 to 100 h, preferably 0 to 48 h.

The invention further provides an aqueous colloidal silica sol which is obtainable by the inventive procedure, characterized in that it has a content of a. aluminium less than or equal to 5 ppm
b. calcium less than or equal to 5 ppm
c. iron less than or equal to 20 ppm
d. barium less than or equal to 5 ppm
e. titanium less than or equal to 7 ppm
f. zirconium less than or equal to 5 ppm
g. magnesium less than or equal to 5 ppm
h. phosphorus less than or equal to 5 ppm, and the sum of the abovementioned impurities is less than 50 ppm, all content figures being based on the proportion of colloidally dispersed solids.

In addition, the present invention provides for the use of the inventive aqueous colloidal silica sol for polishing compositions.

The present invention further provides an aqueous silica solution resulting as an intermediate from step b) in the process according to the invention, characterized in that it has a content of a. aluminium less than or equal to 5 ppm
b. calcium less than or equal to 5 ppm
c. iron less than or equal to 20 ppm
d. barium less than or equal to 5 ppm
e. titanium less than or equal to 7 ppm
f. zirconium less than or equal to 5 ppm
g. magnesium less than or equal to 5 ppm
h. phosphorus less than or equal to 5 ppm, and the sum of the abovementioned impurities is less than 50 ppm, all content figures being based on the proportion of dissolved solids.

Finally, the subject-matter of the present invention also includes silicon dioxide obtainable by dewatering the aqueous colloidable silica sol or aqueous silica solution obtained by the process according to the invention, characterized in that the content of a. aluminium is less than or equal to 5 ppm
b. calcium is less than or equal to 5 ppm
c. iron is less than or equal to 20 ppm
d. barium is less than or equal to 5 ppm
e. titanium is less than or equal to 7 ppm
f. zirconium is less than or equal to 5 ppm
g. magnesium is less than or equal to 5 ppm
h. phosphorus is less than or equal to 5 ppm, and the sum of the abovementioned impurities is less than 50 ppm.

DETAILED DESCRIPTION

Figure 1:
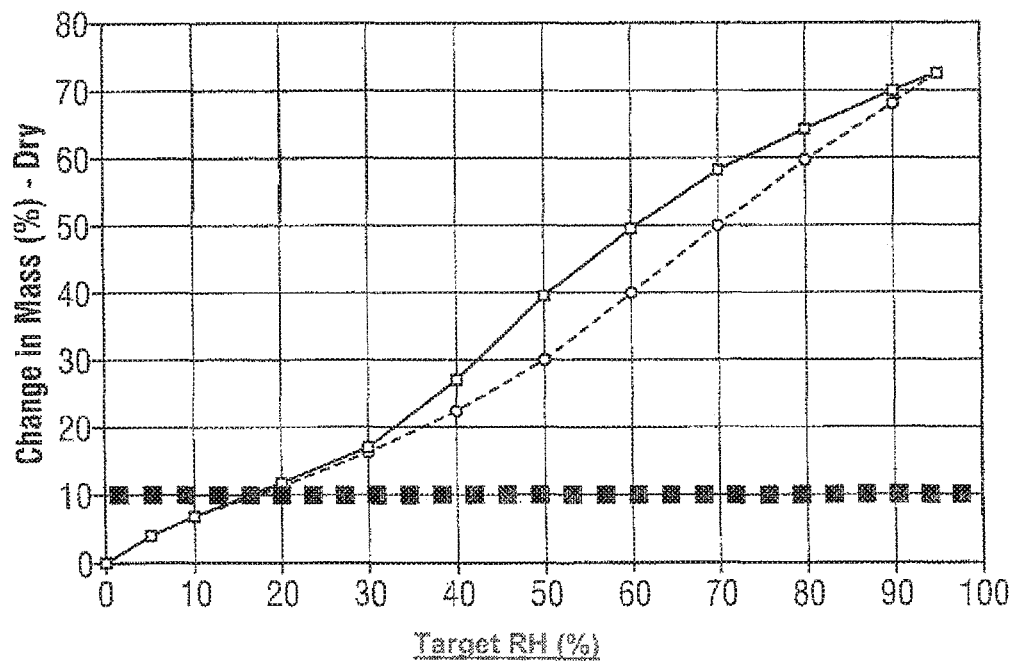
FIG. 1 is a graph showing an isotherm of water absorption for disclosed high-purity silica.

The inventors have found that, surprisingly, it is possible in a simple manner by suitable pH management in combination with ion exchangers, proceeding from aqueous alkali metal silicate solutions as an inexpensive raw material basis, to obtain high-purity aqueous silica, and from this to prepare, by a direct route, without precipitation of a solid as an intermediate, aqueous colloidal silica sols in a purity sufficient for CMP applications. An essential feature of the process is that the starting solution of a water-soluble alkali metal silicate before performance of any ion exchange steps which serve for purification is adjusted to a very low pH in the range from 0 to less than 2. Without being bound to a particular theory, the inventors are of the view that the very low pH possibly ensures that ideally no free, negatively charged SiO groups to which troublesome metal ions can be bound are present on the silica surface. At a very low pH, the silica surface, as a result of the protonation, can even be positively charged, such that metal cations are repelled from the silica surface. If the silica surface takes on a positive charge, electrostatic repulsion between the individual silica species additionally prevents them from agglomerating with one another and thus forming cavities in which impurities could be deposited. Troublesome metal-based impurities are therefore present primarily in the form of cations dissociated from the silica and freely mobile in the solution, and can thus be removed effectively from the solution by ion exchange under strongly acidic conditions.

The expression "metal-based impurities (of metal x)" in the context of the present invention is understood to mean metal(s) present in the colloidal silica sols prepared or the materials from which they are prepared, which may be present in elemental and/or ionic form and/or as compound(s). Content figures for metal-based impurities are based here, unless stipulated otherwise, on the content of a metal/group of metals taking account of presence in elemental and ionic form, and in the form of compounds in the possibly dissolved or dispersed $SiO_2$-based solids, expressed in parts by weight (ppm) of the metallic element(s) in question.

The process according to the invention can be performed in conventional apparatus and enables, compared to the prior art processes based on alkali metal silicate solutions as a starting material, much simpler and more effective purification with regard to a wide spectrum of metal-based impurities. The use of inexpensive, readily available technical alkali metal silicate solutions such as waterglass as a starting material for preparation of aqueous colloidal silica sols in a purity sufficient for CMP applications is a further economically important advantage of the process.

The water-soluble alkali metal silicate or aqueous solution thereof used in step a) of the process according to the invention may be any desired water-soluble alkali metal silicate or aqueous solution thereof. Preference is given, however, to using sodium silicate (solution) and/or potassium silicate (solution). It is also possible to use mixtures of a plurality of silicate solutions. Inexpensive industrial products of particular interest are especially waterglasses which are prepared on the industrial scale by melting quartz sand together with soda or potash at temperatures around 1200° C. and then dissolving the quenched alkali metal silicate in water under pressure and elevated temperature. The water-soluble alkali metal silicate or aqueous solution thereof used in inventive process step a) is therefore especially a sodium waterglass and/or potassium waterglass having a molar ratio of $SiO_2/A_2O$ (A: Na or K) of 4.5 to 1.5, preferably 4.2 to 1.7, more preferably 4.0 to 2.0. Commercial waterglasses generally contain, in addition to their silicon and alkali metal contents, metal-based impurities of polyvalent metals such as Al, Fe, Zr, Ti, Ca, Mg and P, which are present essentially in ionic form and/or in the form of oxidic compounds thereof. A waterglass solution with an $SiO_2$ content of 28.9% by weight and $Na_2O$ content of 8.97% by weight sold by PQ Corp. (Surrey) contains, for example, 89 ppm of Al, 50 ppm of Fe, 18 ppm of Ti, 12 ppm of Ca, 0.8 ppm of Ba, 7.9 ppm of Mg, 31 ppm of Zr and 4.5 ppm of P, based on the solution. Metal-based impurities may, in the case of use of waterglasses which are obtained from industrial waste products, for instance silica-containing fly ashes (for example by the process of EP 0006202 A1), even be present in concentrations up to several tens of thousands of ppm based on the $SiO_2$ content.

In principle, for the process according to the invention, it is also possible to use water-soluble alkali metal silicates or aqueous solutions thereof which already feature a high purity, for instance alkali metal silicate solutions prepared from fumed silica. However, due to the higher costs for the starting material, this option will only be of interest when the purity requirements for a particular application cannot be met by purification of less expensive starting materials, for instance waterglass, according to the process.

The acidifier used in step a) of the process according to the invention may be hydrochloric acid, phosphoric acid, nitric acid, sulphuric acid, chlorosulphonic acid, sulphuryl chloride or perchloric acid, in concentrated or dilute form, or mixtures of the aforementioned acids, though it is also possible to use other acidifiers provided that they are suitable for establishment of the process conditions explained in detail below. Dilutions should, if appropriate, be undertaken by adding water, preferably distilled water or demineralized water. It is especially possible to use hydrochloric acid, preferably 0.2 to 14 N, more preferably 1 to 12 N, even more preferably 1 to 10 N, especially preferably 1 to 7 N and very especially preferably 3 to 6 N, phosphoric acid, preferably 0.2 to 59 N, more preferably 2 to 50 N, even more preferably 3 to 40 N, especially preferably 3 to 30 N and very especially preferably 4 to 20 N, nitric acid, preferably 0.2 to 24 N, more preferably 0.2 to 20 N, even more preferably 0.2 to 15 N, especially preferably 2 to 10 N, sulphuric acid, preferably 0.1 to 37 N, more preferably 0.1 to 30 N, even more preferably 1 to 20 N, especially preferably 1 to 10 N. Very particular preference is given to using sulphuric acid.

To mix the water-soluble alkali metal silicate or aqueous solution thereof with the acidifier to prepare an aqueous alkali metal silicate solution with a pH of less than 2, preferably less than 1.5, more preferably less than 1, most preferably less than 0.5, in step a) of the process according to the invention, it is possible to use all known mixing techniques and apparatuses, for example static mixers or dynamic mixers such as rotor-stator machines (e.g. Cavitron®). To continuously mix the acidifier and the alkali metal silicate or aqueous solution thereof, it is possible to use a static mixer or a dynamic mixer (e.g. Cavitron®), preference being given to using a static mixer. The parts of the mixer which come into contact with the reaction medium or at least one of the starting components should be manufactured from a material which has a high chemical resistance to the strongly acidic reaction medium and the starting components and does not introduce any impurities into the reaction medium. Suitable materials are, for example, polymers such as polypropylene or fluorinated polymers, e.g. polytetrafluoroethylene or polyvinylidene fluoride, or corrosion-resistant high-performance alloys such as Hastelloy or Inconel, preference being given to using the polymers mentioned.

The acidifier can be initially charged and the water-soluble alkali metal silicate or aqueous solution thereof can be added, or, vice versa, the water-soluble alkali metal silicate or aqueous solution thereof can be initially charged and the acidifier added. In a preferred variant of the process according to the invention, the acidifier is initially charged and the water-soluble alkali metal silicate or the aqueous alkali metal silicate solution is added. It is preferred here that the water-soluble alkali metal silicate or aqueous solution thereof "sees" a high acid concentration in order to convert the metal ions, especially relatively high-valency metal ions, for example Fe, Al and Zr, to the dissociated form thereof, and thus subsequently to be able to remove them effectively from the silica. Furthermore, the change in the pH should preferably be rapid, such that the neutral pH range, in which the silicate solution has the lowest stability with respect to gelation as a result of advancing polycondensation of silanol groups, is passed through very rapidly. The reaction medium can be heated if required and should have a temperature between 0 and 100° C., though, according to the $SiO_2$ concentration, the temperature must not be selected at too high a level in order to prevent gelation or precipitation of particles. Due to the unavoidable gradual polycondensation of the silicas in the acidic aqueous alkali metal silicate solution, the latter is subject to an ageing process.

The acidic solution containing the water-soluble alkali metal silicate, which is obtained after process step a), has a concentration of 1 to 8% by weight, preferably 3 to 7% by weight, more preferably 4 to 6% by weight, based on the $SiO_2$ content. The acid should be used here in an amount suitable for establishing a concentration ratio (based on parts by weight) between alkali metal silicate (based on the $SiO_2$ content) and the acidifier (based on the total amount thereof used in process step a)) within a range from 0.4 to 40, preferably 1 to 20, more preferably 2 to 10, in the acidic aqueous alkali metal silicate solution obtained after mixing. In a very particularly preferred embodiment of the present invention, the acidic aqueous alkali metal silicate solution contains 4 to 6% by weight of $SiO_2$ and 2-6% by weight of $H_2SO_4$ used. A portion of the $H_2SO_4$ used is consumed here by neutralization. An $SiO_2$ content greater than 8% by weight could lead to the polycondensation of silanol groups advancing much more rapidly, such that the acidic aqueous alkali metal silicate solution gelates within the time required for the performance of the process according to the invention. More particularly, such a high $SiO_2$ concentration could result in gelation on the ion exchangers, and so the economic viability of the process would be reduced. On the other hand, an $SiO_2$ content less than 1% by weight is undesirable since this could lower the effectiveness of the process to such an extent that it would no longer be economically viable. Above a concentration ratio between alkali metal silicate (based on the $SiO_2$ content) and the acidifier of 40, the degree of protonation of the silica needed for effective removal of the metal impurities, which should lead to a positive electrical charge of the silica surface, possibly cannot be ensured, whereas an excessive amount of acid is introduced below a value of this ratio of 0.4, such that the ballast of anions to be removed by means of ion exchange in the course of the purifying process is possibly increased unnecessarily.

In a preferred variant of the process according to the invention, an oxidizing agent, for example a peroxide or perchlorate, is added to the acidic aqueous alkali metal silicate solution from step a). This is more preferably hydrogen peroxide or potassium peroxide disulphate. It is especially preferred that the acidic aqueous alkali metal silicate solution comprises hydrogen peroxide. The oxidizing action of the oxidizing agent can convert metal-based impurities which occur in different oxidation states to a higher-valency oxidation state. If the binding affinities of the different oxidation states with regard to the ion exchanger materials used in step a1) and/or b) of the process according to the invention differ, a more efficient removal of metal impurities might thus be possible. In addition, peroxides with Ti(IV) ions give rise, under acidic conditions, to a titanium peroxo compound which causes a yellow-orange colour impression. The yellow-orange colour of the acidic aqueous alkali metal silicate solution allows the degree of purification during the purification within the process according to the invention to be appreciated visually. This is because it has been found that specifically titanium is a very persistent impurity which unhesitatingly agglomerates with silica even at pH values above 2. The inventors have found that, when the yellow-orange colour disappears, a purity of the silica which occurs as an intermediate sufficient for CMP applications of colloidal silica sols is generally attained. In order to use this indicator function of the peroxide, it is also possible to add the peroxide not in step a) but rather in any other process step.

In the optional step a1) of the process according to the invention, the acidic aqueous alkali metal silicate solution prepared in step a), before performance of step b), is contacted with a resin containing chelate-forming functional groups with binding affinity for divalent or higher-valency metal ions. This resin is preferably a resin containing phosphonic acid and/or (substituted) amino phosphonic acid groups and/or sulphonic acid groups and/or carboxyl groups as chelate-forming functional groups, and is designed for ion exchange under strongly acidic conditions. Such resins are available as commercial products for industrial use, for example under the Purolite S957, Purolite S940, Purolite S950 (from Purolite), Lewatit TP260 (from LanXess), Diphonix (from Triskem) or Amberlite IRC747 (from Rohm and Haas) names. Purolite S957 and Lewatit TP260 are used with particular preference in the context of the present invention.

The contacting of the abovementioned acidic alkali metal silicate solution with the above-described resin in process step a1) is preferably performed by passing the acidic alkali metal silicate solution at 4 to 100° C., preferably 10 to 40° C., through a column filled with the resin in an amount sufficient for the exchange of 1-1000 times the total amount of the impurities of polyvalent metals present in the solution.

The acidic aqueous alkali metal silicate solution passed through the column, which has a pH in the range from 0 to 2, contains only very low concentrations of polyvalent metal impurities, while alkali metal ions and acid anions which have been introduced in step a) are still present in relatively high concentrations. For instance, in the case of use of sulphuric acid as an acidifier, the aqueous acidic alkali metal silicate solution obtained from process step a1) in the process according to the invention typically has a content of Al≤5 ppm, Ti≤7 ppm, Zr≤5 ppm, Fe≤20 ppm, Na≥1000 ppm and S≥1000 ppm, based on the $SiO_2$ content.

In step b) of the process according to the invention, the acidic aqueous alkali metal silicate solution obtained from process step a) or a1) is contacted with a basic anion exchange resin of the hydroxyl type and an acidic cation exchange resin of the hydrogen type. The anion exchange serves to remove anions, especially the acid anions introduced in step a), while the cation exchange significantly reduces the content of metal-based impurities, especially also the concentration of the alkali metal cations present in the solution. The basic anion exchange resin of the hydroxyl type and the acidic cation exchange resin of the hydrogen type used may be any resins which have been used to date in this technical field for removal of anions or metal cations from waterglass-containing aqueous solution. Examples of suitable commercially available resins are Lewatit S100 (gel) and Lewatit SP112 (macroporous), and also strongly acidic cation exchange resins of the hydrogen type and Lewatit CNP80 as a weakly acidic cation exchange resin of the hydrogen type, Lewatit M600 (gel) and Lewatit MP500 (macroporous) as strongly basic anion exchange resins of the hydroxyl type, and Lewatit MP62 as a weakly basic anion exchange resin of the hydroxyl type.

The contact in process step b) can be performed such that the abovementioned acidic aqueous alkali metal silicate solution is contacted first with the basic anion exchange resin of the hydroxyl type and then, in a spatially separate manner, with the acidic cation exchange resin of the hydrogen type, or, vice versa, first with the acidic cation exchange resin of the hydrogen type and then, in a spatially separate manner, with the basic anion exchange resin of the hydroxyl type. It is also possible here to contact the acidic aqueous alkali metal silicate solution repeatedly with said ion exchangers in the manner described above in a circuit. The anion exchange preferably precedes the cation exchange, since the proton concentration reduced by the anion exchange in solution increases the exchange effectiveness with regard to the dissolved metal cations in the cation exchange. In a further preferred embodiment of the present invention, the contact in process step b) is performed in such a way that the acidic cation exchange resin of the hydrogen type and the basic anion exchange resin of the hydroxyl type are mixed, i.e. used in a mixed bed. However, in the case of this mixed use of the ion exchange resins, they have to be separated for regeneration. The $SiO_2$ gelation losses which occur unavoidably and to different degrees according to the process conditions can generally be recovered by treatment of the ion exchange resins used in the context of the present invention with aqueous alkali metal hydroxide solution in the form of aqueous alkali metal silicate solution.

The contact in process step b) is additionally performed more particularly by passing the acidic aqueous alkali metal silicate solution at 4 to 100° C., preferably 10 to 40° C., through a column filled with the basic anion exchange resin of the hydroxyl type and the acidic cation exchange resin of the hydrogen type in a mixed manner, or through a plurality of columns connected sequentially to one another, which contain the basic anion exchange resin of the hydroxyl type and the acidic cation exchange resin of the hydrogen type in spatially separate form. The anion exchange resin is used here in an amount sufficient for the exchange of 1-100 times the total amount of the anions present in the contacted solution, the cation exchange resin in an amount sufficient for the exchange of 1-100 times the total amount of the content of metal-based impurities present in the contacted solution.

The aqueous silica solution obtained as an intermediate after step b) of the process according to the invention is characterized in that it has a pH in the range from 1 to 5, preferably from 2 to 5, most preferably from 3 to 4.

The aqueous silica solution obtained as an intermediate after step b) of the process according to the invention is also characterized in that it has a content of
 a. aluminium less than or equal to 5 ppm, preferably 0.001 to 4 ppm, more preferably 0.05 to 3 ppm, most preferably 0.1 to 2 ppm,
 b. calcium less than or equal to 5 ppm, preferably 0.001 to 4 ppm, more preferably 0.1 to 3 ppm, most preferably 0.5 to 2 ppm,
 c. iron less than or equal to 20 ppm, preferably 0.001 to 20 ppm, more preferably 0.1 to 15 ppm, most preferably 0.5 to 10 ppm,
 d. barium less than or equal to 5 ppm, preferably 0.001 to 4 ppm, more preferably 0.05 to 3 ppm, most preferably 0.1 to 2 ppm,
 e. titanium less than or equal to 7 ppm, preferably 0.001 to 5 ppm, more preferably 0.1 to 3 ppm, most preferably 0.5 to 2 ppm,
 f. zirconium less than or equal to 5 ppm, preferably 0.001 to 3 ppm, more preferably 0.05 to 2 ppm, most preferably 0.1 to 1 ppm,
 g. magnesium less than or equal to 5 ppm, preferably 0.001 to 5 ppm, more preferably 0.1 to 4 ppm, most preferably 0.5 to 3 ppm,
 h. phosphorus less than or equal to 5 ppm, preferably 0.001 to 3 ppm, more preferably 0.01 to 1 ppm, most preferably 0.01 to 0.5 ppm, and the sum of the abovementioned impurities is less than 50 ppm, preferably less than 35 ppm, more preferably less than 25 ppm, where all content figures are based on the proportion of dissolved solids.

This aqueous silica solution is a clear solution or a colloidal solution. It can be stabilized by alkalizing by means of addition of any conventional base, for example alkali metal hydroxide or an amine, within a pH range from 8 to 12.

The high-purity aqueous silica solution obtained in step b) can be used in step c) of the process according to the invention as a starting solution to form an aqueous colloidal silica sol. The growth of colloidal silica particles can be brought about here by means of any known process for forming a stable aqueous colloidal silica sol from aqueous silica solution (cf., for example, "The Chemistry of Silica: Solubility, Polymerization, Colloid and Surface Properties and Biochemistry of Silica", R. K. Iler, John Wiley and Sons, 1979 and "Colloidal Silica—Fundamentals and Applications", Editors: H. E. Bergma, W. O. Roberts, CRC Press, 2006, ISBN: 0-8247-0967-5). Typically, for this purpose, the temperature, the concentration and the pH of the aqueous silica solution are adjusted such that nucleation and particle growth are initiated. For instance, in a standard procedure, the pH of the aqueous silica solution is adjusted to a pH between 8 and 10.5 with the aid of alkali metal hydroxide and the solution is heated to approx. 90° C. The particles which form then serve as nuclei which grow as a result of addition of further silica solution and alkali metal hydroxide at a pH in the range from 8 to 10.5 and a temperature of approx. 90° C. to give the desired particle size. In the process described in EP 0537375 A1, colloidal silica particles are formed by feeding an aqueous silica solution with an $SiO_2$ content of 1-6% by weight into a high-purity aqueous alkali metal silicate solution containing 0.1-8% by weight of $SiO_2$ or 0.1-5% by weight alkali metal hydroxide solution heated to 60-150° C. over a period of 1-20 h until a molar $SiO_2/M_2O$ ratio (M: alkali metal) in the range of 30-300 has been established. JP 2003-089786 A proceeds from a 3-10% by weight (based on $SiO_2$ content) aqueous silica solution which is adjusted to a pH of >8 and to a temperature of 95-100° C. to form colloidal particles by alkalizing with an amine or quaternary ammonium hydroxide.

The inventive aqueous colloidal silica sols are characterized in that the content therein of
 a. aluminium is less than or equal to 5 ppm, preferably 0.001 to 4 ppm, more preferably 0.05 to 3 ppm, most preferably 0.1 to 2 ppm,
 b. calcium is less than or equal to 5 ppm, preferably 0.001 to 4 ppm, more preferably 0.1 to 3 ppm, most preferably 0.5 to 2 ppm,
 c. iron is less than or equal to 20 ppm, preferably 0.001 to 20 ppm, more preferably 0.1 to 15 ppm, most preferably 0.5 to 10 ppm,
 d. barium is less than or equal to 5 ppm, preferably 0.001 to 4 ppm, more preferably 0.05 to 3 ppm, most preferably 0.1 to 2 ppm,
 e. titanium is less than or equal to 7 ppm, preferably 0.001 to 5 ppm, more preferably 0.1 to 3 ppm, most preferably 0.5 to 2 ppm,
 f. zirconium is less than or equal to 5 ppm, preferably 0.001 to 3 ppm, more preferably 0.05 to 2 ppm, most preferably 0.1 to 1 ppm,
 g. magnesium is less than or equal to 5 ppm, preferably 0.001 to 5 ppm, more preferably 0.1 to 4 ppm, most preferably 0.5 to 3 ppm, h. phosphorus is less than or equal to 5 ppm, preferably 0.001 to 3 ppm, more preferably 0.01 to 1 ppm, most preferably 0.01 to 0.5 ppm, and the sum of the abovementioned impurities is less than 50 ppm, preferably less than 35 ppm, more preferably less than 25 ppm, where all content figures are based on the proportion of colloidally dispersed solids.

The inventive aqueous colloidal silica sols are thus notable compared to colloidal silica sols prepared from alkali metal silicate solutions as the starting material, which have been described in the prior art, by a higher purity with regard to a broad spectrum of metal-based impurities. The efficient removal of metal-based impurities, even of those which are removable only with difficulty by conventional means, for instance Ti or Zr, is attributable crucially to the inventive process regime and in particular to the establishment of a very low pH in the range from 0 to less than 2 in the starting solution of a water-soluble alkali metal silicate before performance of any ion exchange steps which serve for purification. In addition, the particles formed remain in the colloidal state in solution during the process according to the invention, in contrast, for instance, to the processes described in WO 2010/037705 A1 and WO 2010/037702 A1.

The inventive aqueous colloidal silica sols have a purity sufficient for CMP applications and are additionally preparable inexpensively and in a simple manner, such that they are outstandingly suitable for use for polishing compositions, especially in the sector of the semiconductor and electronics industry for polishing of wafers of high-purity silicon, semiconductor materials and components, magnetic storage media and crystal substrates.

Formulations of polishing compositions may comprise, in addition to the inventive aqueous colloidal silica sols, one or more additives, for example further abrasive particles such as ceria, alumina, zirconia or organic colloidal particles, chelating agents, oxidizing agents, interface-active substance, water-soluble polymer, corrosion inhibitor, fungicide, pH indicator, water-miscible organic solvent, dye or dispersant. Suitable additives are detailed, for example, in paragraphs [0071]-[0079] of U.S. patent application Ser. No. 12/230,353, published as U.S. Patent Publication No. 2009/0223136 A1.

The inventive aqueous colloidal silica sols can be concentrated by ultrafiltration or evaporation of the aqueous solution phase. The addition of a water-soluble chelating agent to the aqueous colloidal silica sol or of a solution used for preparation thereof offers, in combination with a concentration of the sol by ultrafiltration, an option for further reduction in the content of metal-based impurities in the sol. Suitable chelating agents and/or ultrafiltration membranes can be found, for example, in paragraph [0012] and/or [0016] of JP 2003-089786 A and/or paragraphs [0021]-[0023] of JP 2006-036612 A.

By dewatering, it is possible to obtain silicon dioxide from the inventive aqueous colloidal silica sols or the inventive aqueous silica solution, characterized in that the content of a. aluminium is less than or equal to 5 ppm, preferably 0.001 to 4 ppm, more preferably 0.05 to 3 ppm, most preferably 0.1 to 2 ppm, b. calcium is less than or equal to 5 ppm, preferably 0.001 to 4 ppm, more preferably 0.1 to 3 ppm, most preferably 0.5 to 2 ppm, c. iron is less than or equal to 20 ppm, preferably 0.001 to 20 ppm, more preferably 0.1 to 15 ppm, most preferably 0.5 to 10 ppm, d. barium is less than or equal to 5 ppm, preferably 0.001 to 4 ppm, more preferably 0.05 to 3 ppm, most preferably 0.1 to 2 ppm, e. titanium is less than or equal to 7 ppm, preferably 0.001 to 5 ppm, more preferably 0.1 to 3 ppm, most preferably 0.5 to 2 ppm, f. zirconium is less than or equal to 5 ppm, preferably 0.001 to 3 ppm, more preferably 0.05 to 2 ppm, most preferably 0.1 to 1 ppm, g. magnesium is less than or equal to 5 ppm, preferably 0.001 to 5 ppm, more preferably 0.1 to 4 ppm, most preferably 0.5 to 3 ppm, h. phosphorus is less than or equal to 5 ppm, preferably 0.001 to 3 ppm, more preferably 0.01 to 1 ppm, most preferably 0.01 to 0.5 ppm, and the sum of the abovementioned impurities is less than 50 ppm, preferably less than 35 ppm, more preferably less than 25 ppm.

The dewatering can be effected by ultrafiltration or evaporation of the aqueous solution phase and subsequent drying. If required, it is possible here to perform additional wash steps using an aqueous solution of one of the above-specified acidifiers and/or demineralized water as wash solution(s) for further purification.

The resulting high-purity silicon dioxide can be used for production of elemental silicon or as a high-purity raw material for the production of high-purity quartz glass for light waveguides or glass equipment for the laboratory and electronics, or for production of glass blanks, for example boules, or for production of glass mouldings, for example overcladding tubes or core rods, or as inner cladding material in light waveguides, or for production of core material in planar waveguides, or for production of crucibles, or for production of optical lenses and prisms and photomasks, or for production of diffraction grids, electrical, thermal and magnetic insulators, or for production of vessels and apparatuses for the chemical, pharmaceutical and semiconductor industries and solar industry, or for production of glass rods and glass tubes, or for coating of metals, plastics, ceramics or glass, or as a filler in metals, glasses, polymers and coating materials or as a polishing composition for semiconductor material and electrical circuits, or for production of lamps or as a carrier material in the production of solar cells, or as a support material for catalysts.

Figure 2:
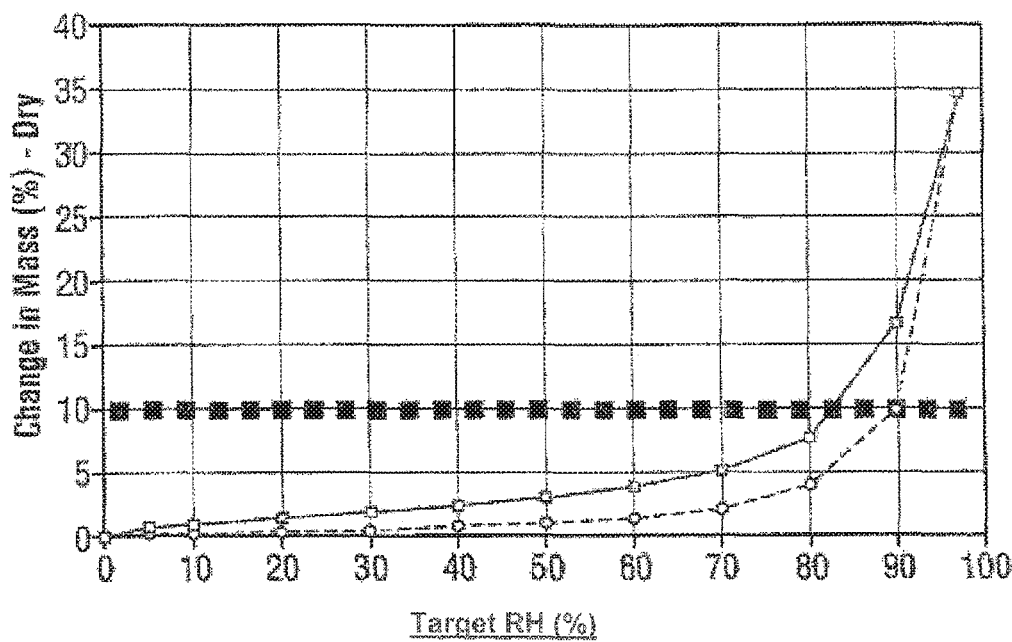
FIG. 2 is a graph showing an isotherm of water absorption for conventional silica, Aerosil® A200.
Figure 3:
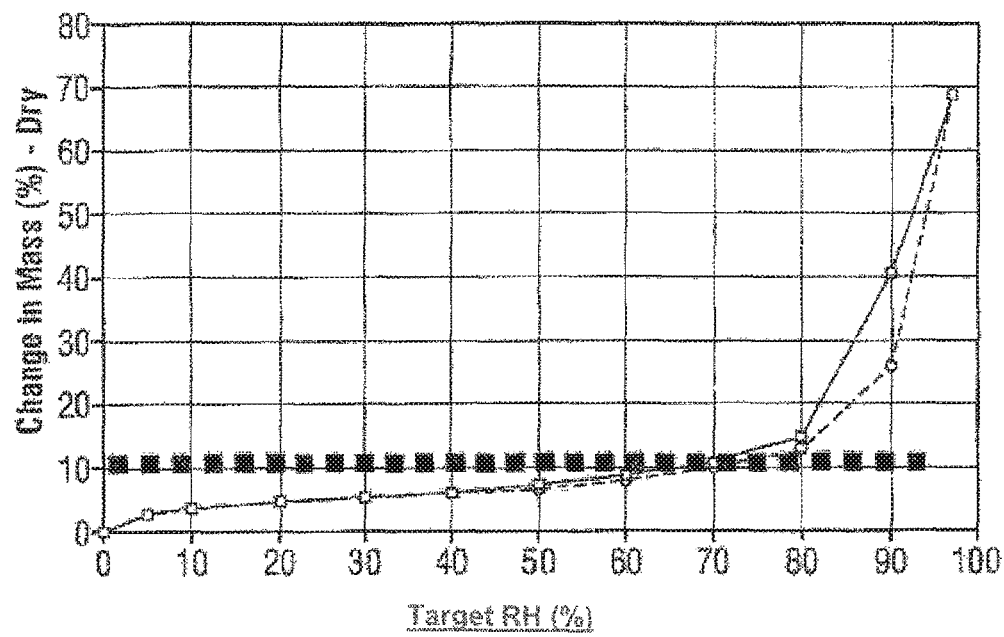
FIG. 3 is a graph showing an isotherm of water absorption for conventional silica, Sipernat® 320 DS.
Figure 4:
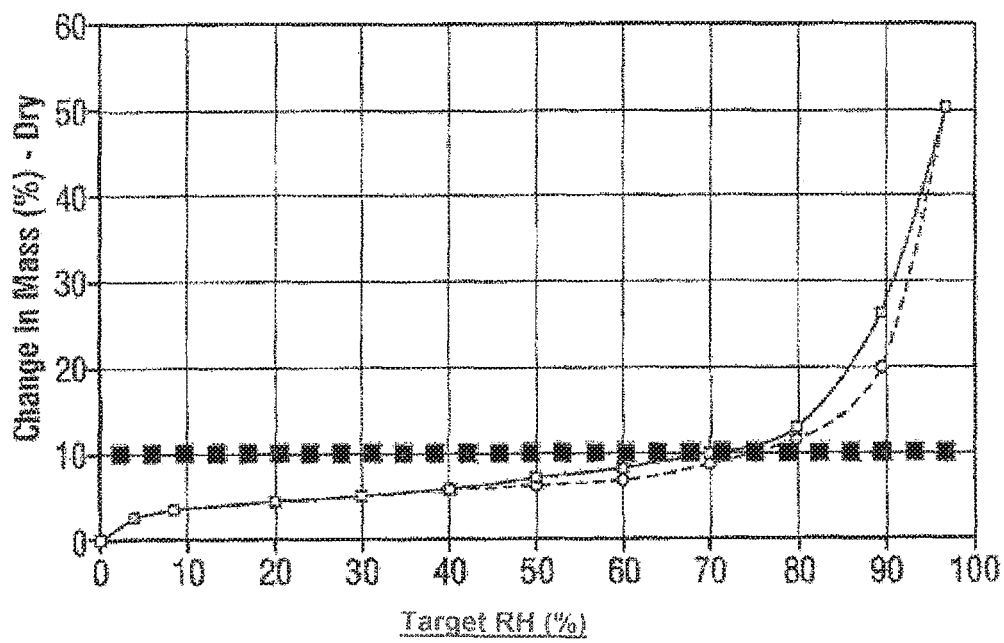
FIG. 4 is a graph showing an isotherm of water absorption for conventional silica, Ultrasil® VN3.

A surprising finding was that the water content of the high-purity silica obtained, even in the range of high air humidities, correlates with the ambient humidity. The high-purity silica is capable of absorbing more than 500 times the amount of water that can typically be absorbed by silica. This new property sets the products apart significantly from the silica properties known to date; such high water absorption values have been attained to date only by zeolites. The particularly high water absorption capacity, which results in very good usability as an inexpensive desiccant, is possibly attributable to a novel pore structure in the high-purity silica; this is supported especially by the untypical absorption isotherms of the inventive material (FIG. 1) (absorption curve marked by means of circles, desorption curve marked by means of squares). The virtually linear profile of the absorption curve, contrasting to conventional silica (FIG. 2: Aerosil® A200, FIG. 3: Sipemat® 320 DS and FIG. 4: Ultrasil® VN3; absorption curves marked in each case by means of circles, desorption curves marked in each case by means of squares), enables efficient water storage or water recovery even below a relative air humidity of 70%, which was not possible to date.

An altered pore structure might also be the reason for further positive use properties of the high-purity silica. For instance, the products have surprisingly good suitability as a support material for catalysts, especially as a support material for hydrogenation catalysts, and as an insulation material, especially in the area of ventilated or slightly evacuated thermal insulation systems. In addition, there are possible uses for drinking water production or water storage in dry regions, for water recovery, especially in greenhouses, for moisture regulation, especially in closed (living) spaces, and for fire protection, especially in tunnels. The adsorptive loading of the high-purity silica with water, for example for drinking water production, is preferably effected at times of high relative air humidity, especially overnight, while the water release is preferably effected during the day in the form of solar desorption. The mineralization of the water obtained from the atmosphere to give potable water can be effected, for example, by means of sand bed filters; use of the water for agricultural purposes is of course possible without any further measures.

Microbe colonization of the high-purity silica can preferably be counteracted by admixing it with oxides of elements of the fourth transition group of the Periodic Table, especially with titanium dioxide.

As water is adsorbed by the high-purity silica, a significant temperature increase occurs. This effect can be exploited in conjunction with the low thermal conductivity of the material in such a way that the silica is used as a heat storage medium—preferably independent of the supply of thermal energy.

The examples which follow are intended to illustrate the present invention in detail.

EXAMPLES

Determination of the Content of Impurities Description of method for determining element traces in silica by means of high-resolution inductively coupled plasma mass spectrometry (HR-ICPMS)

For trace analysis, samples of the aqueous colloidal silica sols and of the aqueous silica solutions were each concentrated to dryness in a quartz beaker.

In each case approx. 5 g of the solid sample material obtained from the above-described dewatering were weighed into a cleaned PFA beaker and the weight was detected gravimetrically, accurately to ±1 mg. After adding 1 g of mannitol solution (1% by weight) for stabilization of boron during the sample treatment, the particular sample was dissolved in 15 ml of ultrapure water and approx. 25-30 g of high-purity hydrofluoric acid (approx. 50% by weight). Subsequently, the sample vessel containing the solution was heated to 120° C. by means of a heating block in order to gradually completely evaporate off the silicon present in the sample in the form of hexafluorosilicic acid and also the excess hydrofluoric acid. After cooling, the dry residue resulting therefrom was dissolved again in 0.5 ml of concentrated high-purity nitric acid (approx. 65% by weight) with addition of a few drops of high-purity hydrogen peroxide solution (approx. 30% by weight), and then made up to a volume of 10 ml with ultrapure water.

Aliquots of these sample solutions (100 µl, 200 µl, 500 µl or 1000 µl) were transferred into pre-cleaned polypropylene sample tubes and, after addition of 50 µl of indium solution (100 µg/l) as an internal standard, made up to a final volume of 5 ml with dilute high-purity nitric acid solution (approx. 3% by weight). The preparation of several dilutions served for internal quality assurance, in order to be able to identify and eliminate any errors in the sample preparation and analysis.

Multielement standards (c=10 mg/l) in which the elements to be determined are present were used to prepare, by volumetric dilution, several calibration standards of 0.5 µg/l, 1.0 µg/l, 2.0 µg/l, 5 µg/l and 10 µg/l. Analogously to the sample solutions, 50 µl of indium solution (100 µg/l) per 5 ml of final volume were likewise added as an internal standard to these calibration standards. In addition, several blank solutions were prepared from dilute nitric acid (approx. 3% by weight) with 50 µl of indium solution (c=100 µg/l) per 5 ml of final volume.

The element contents in the blank, calibration and sample solutions thus prepared were determined by means of high-resolution inductively coupled plasma mass spectrometry (HR-ICPMS) using linear external calibration. The ICP-MS analysis was effected with a mass resolution (m/Δm) of at least 3500 or of at least 10 000 for the elements potassium, arsenic and selenium.

Chemicals:

Waterglasses:

Two different commercial waterglass solutions from PQ Corp. (Surrey) and from Cognis were used. Table 1 shows the relative proportions by weight of $SiO_2$ and $Na_2O$ therein, and the content of relevant trace elements in the solutions.

TABLE 1

| Waterglass solutions used | | |
|---|---|---|
| | From PQ Corp. (Surrey) | From Cognis |
| $SiO_2$ | 28.9% by wt. | 26.7% by wt. |
| $Na_2O$ | 8.97% by wt. | 7.95% by wt. |
| Element | ppm | ppm |
| Al | 89 | 150 |
| B | 0.6 | 1.2 |
| Ba | 0.8 | 5.7 |
| Ca | 12 | 11 |
| Cd | <0.5 | <0.5 |
| Ce | 0.6 | 1.2 |
| Co | <0.5 | <0.5 |
| Cr | <0.5 | 0.7 |
| Cu | <0.5 | <0.5 |
| Fe | 50 | 55 |
| Hg | <0.5 | <0.5 |
| K | 16 | 32 |
| Li | 0.6 | 1.5 |
| g | 7.9 | 7.7 |
| Mn | <0.5 | 0.6 |
| Ni | <0.5 | <0.5 |
| P | 4.5 | 3.2 |
| S | 45 | 7.6 |
| Sn | <0.5 | <0.5 |
| Sr | 0.5 | 2.1 |
| Ti | 18.3 | 40 |
| Zn | <0.5 | <0.5 |
| Zr | 31 | 13 | concentrated sulphuric acid, puriss. p.a., 95-97% by weight (from Sigma-Aldrich, No. 30743)

hydrogen peroxide, purum p.a., ≥35% by weight (from Sigma-Aldrich, No. 95299)

strongly acidic cation exchanger, LEWATIT® MonoPlus S100 (from LanXess)

strongly basic anion exchanger, LEWATIT® MonoPlus M600 (from LanXess)

chelating ion exchanger, LEWATIT® TP260 (from LanXess)

chelating ion exchanger, Purolite® S957 (from Purolite)

The waterglass solutions and the concentrated sulphuric acid were diluted with demineralized water if required.

Example 1

A beaker was initially charged with 255 g of sulphuric acid (8.4% by weight) and 1.6 g of hydrogen peroxide (35% by weight), and 307 g of waterglass ($SiO_2$: 11% by weight; PQ) were added dropwise while stirring, which gave a clear, yellow-orange solution with a pH of ≤1. The resulting acidic aqueous alkali metal silicate solution was then poured over the chelating ion exchanger LEWATIT® TP260. In the course of this, the pH changed only marginally, if at all. Subsequently, the acidic aqueous alkali metal silicate solution was poured over a previously regenerated mixed bed ion exchanger (60% by weight of strongly acidic LEWATIT® MonoPlus S100 and 40% by weight of strongly basic LEWATIT® MonoPlus M600). With the main fraction, an aqueous silica solution with a pH in the range from 3 to 5 was obtained. The first fraction and the final fraction were discarded.

The resulting aqueous silica solution was concentrated to dryness in a quartz flask and then trace-analysed as described by means of HR-ICPMS. The contents of some relevant elements determined, based on the solid state, are listed in table 2.

TABLE 2

| Impurity profile of the aqueous silica solution based on the proportion of dissolved solids | | | | | | | | | | | |
|---|---|---|---|---|---|---|---|---|---|---|---|
| Element | Al | B | Ba | Ca | Ce | Fe | Hf | Mg | Na | P | Ti | Zr |
| Content/ppm | 1 | 0.24 | 0.03 | 3 | 0.02 | 18 | 0.06 | 0.53 | 4.2 | 0.16 | 0.32 | 0.61 |

Example 2

A beaker was initially charged with 255 g of sulphuric acid (8.4% by weight) and 1.6 g of hydrogen peroxide (35% by weight), and 307 g of waterglass ($SiO_2$: 11% by weight: PQ) were added dropwise while stirring, which gave a clear, yellow-orange solution with a pH of ≤1. The resulting acidic aqueous alkali metal silicate solution was then poured over the chelating ion exchanger LEWATIT® TP260. In the course of this, the pH changed only marginally, if at all. The eluate was subsequently heated to 80° C. for 50 min and then cooled to room temperature. Subsequently, the acidic aqueous alkali metal silicate solution was poured over a previously regenerated mixed bed ion exchanger (50% by weight of strongly acidic LEWATIT® MonoPlus S100 and 50% by weight of strongly basic LEWATIT® MonoPlus M600). With the main fraction, an aqueous silica solution with a pH in the range from 3 to 5 was obtained. The first fraction and the final fraction were discarded.

The resulting aqueous silica solution was concentrated to dryness in a quartz flask and then trace-analysed as described by means of HR-ICPMS. The contents of some relevant elements determined, based on the solid state, are listed in table 3.

TABLE 3

| Impurity profile of the aqueous silica solution based on the proportion of dissolved solids | | | | | | | | |
|---|---|---|---|---|---|---|---|---|
| Element | Al | Ba | Ca | Fe | Mg | P | Ti | Zr |
| Content/ppm | 0.34 | 0.02 | 1.3 | 7.3 | 0.20 | 2.4 | 0.14 | 1.3 |

Example 3

A beaker was initially charged with 255 g of sulphuric acid (8.4% by weight), and 307 g of waterglass ($SiO_2$: % by weight; PQ) was added dropwise while stirring. The resulting acidic aqueous alkali metal silicate solution with a pH of ≤1 was then poured over the chelating ion exchanger LEWATIT® TP260. In the course of this, the pH changed only marginally, if at all.

The resulting acidic aqueous alkali metal silicate solution was concentrated to dryness in a quartz flask and then trace-analysed as described by means of HR-ICPMS. The contents of some relevant elements determined, based on the solid state, are listed in table 4.

TABLE 4

| Impurity profile of the acidic aqueous alkali metal silicate solution based on the proportion of the dissolved solids | | | | | | | |
|---|---|---|---|---|---|---|---|
| Element | Al | Ba | Fe | Mg | P | Ti | Zr |
| Content/ppm | 0.6 | <1 | 10 | 0.9 | 5 | 0.4 | 1 |

Example 4

A beaker was initially charged with 255 g of sulphuric acid (8.4% by weight) and 1.6 g of hydrogen peroxide (35% by weight), and 307 g of waterglass ($SiO_2$: 11% by weight; PQ) were added dropwise while stirring, which gave a clear, yellow-orange solution with a pH of ≤1. This acidic aqueous alkali metal silicate solution was then poured over the chelating ion exchanger LEWATIT® TP260. In the course of this, the pH changed only marginally, if at all. After ageing at room temperature for four days, the solution was poured over the strongly basic LEWATIT® MonoPlus M600 ion exchanger and then over the strongly acidic LEWATIT® MonoPlus S100.

The resulting aqueous silica solution with a pH in the range from 3 to 5 was concentrated to dryness in a quartz flask and then trace-analysed as described by means of HR-ICPMS. The contents of some relevant elements determined, based on the solid state, are listed in table 5.

TABLE 5

Impurity profile of the aqueous silica solution based on the proportion of dissolved solids

| Element | Al | Ba | Ca | Fe | Mg | Ti | Zr |
|---|---|---|---|---|---|---|---|
| Content/ppm | 0.17 | 0.01 | 1.7 | 6.3 | 0.34 | 0.03 | 0.08 |

Example 5

A beaker was initially charged with 412 g of sulphuric acid (4% by weight) and 1.6 g of hydrogen peroxide (35% by weight), and 150 g of waterglass ($SiO_2$: 15% by weight; Cognis) were added dropwise while stirring, which gave a clear, yellow-orange solution with a pH of ≤1. This acidic aqueous alkali metal silicate solution was then poured over the chelating ion exchanger Purolite® S957. In the course of this, the pH changed only marginally, if at all.

The resulting acidic aqueous alkali metal silicate solution was subsequently adjusted to a pH of 10 to 11 with NaOH and then concentrated to dryness, and subsequently trace-analysed as described by means of HR-ICPMS. The contents of some relevant elements determined, based on the solid state, are listed in table 6.

TABLE 6

Impurity profile of the alkaline aqueous alkali metal silicate solution based on the proportion of dissolved solids

| Element | Al | Ba | Fe | Mg | Ti | Zr |
|---|---|---|---|---|---|---|
| Content/ppm | 1 | 1 | 12 | 4 | 0.9 | 1 |

Example 6

A beaker was initially charged with 412 g of sulphuric acid (4% by weight), and 150 g of waterglass ($SiO_2$: 15% by weight; Cognis) were added dropwise while stirring. The resulting acidic aqueous alkali metal silicate solution with a pH of ≤1 was then poured over the chelating ion exchanger Purolite® S957. In the course of this, the pH changed only marginally, if at all.

The acidic aqueous alkali metal silicate solution obtained was subsequently adjusted to a pH of 10 to 11 with NaOH and then concentrated to dryness, and subsequently trace-analysed as described by means of HR-ICPMS. The contents of some relevant elements determined, based on the solid state, are listed in table 7.

TABLE 7

Impurity profile of the alkaline aqueous alkali metal silicate solution based on the proportion of dissolved solids

| Element | Al | Ba | Fe | Mg | Ti | Zr |
|---|---|---|---|---|---|---|
| Content/ppm | 5 | 0.5 | 19 | 2 | 6 | 1 |

Example 7

Comparative Example 400 g of waterglass ($SiO_2$: 26.7% by weight; Cognis) were diluted to 5% by weight ($SiO_2$) with demineralized water and then poured over the strongly acidic LEWATIT® MonoPlus S100 ion exchanger. The acidic aqueous silica solution obtained had a pH of 4. Then concentrated sulphuric acid was added until the solution had a pH of 1 to 2, and the solution was subsequently poured over the chelating ion exchanger Purolite® S957 which had been adjusted beforehand with sulphuric acid to a pH of 1 to 2.

The resulting acidic aqueous silica solution was subsequently adjusted to a pH of 10 to 11 with NaOH, then concentrated to dryness, and subsequently trace-analysed as described by means of HR-ICPMS. The contents of some relevant elements determined, based on the solid state, are listed in table 8.

TABLE 8

Impurity profile of the alkaline aqueous alkali metal silicate solution based on the proportion of dissolved solids

| Element | Al | Ba | Fe | Mg | Ti | Zr |
|---|---|---|---|---|---|---|
| Content/ppm | 30 | 0.8 | 25 | 3 | 20 | 9 |

Example 8

By dilution of concentrated sulphuric acid (95-97% by weight) with demineralized water, 7649 g of a dilute aqueous sulphuric acid solution (8.4% by weight) were prepared, and 48 g of hydrogen peroxide (35% by weight) were added to this solution. The resulting solution was then mixed continuously with waterglass (Cognis) of $SiO_2$ concentration 11% by weight by means of a Cavitron® reaction mixer. The volume flow rate for the waterglass metering was 24.6 l/h, and that for the sulphuric acid metering 22 l/h. The mixer was operated here with a frequency of 150 Hz. The acidic (pH≤1) aqueous alkali metal silicate solution obtained, which had a yellow-orange colour, was then poured over the chelating ion exchanger LEWATIT® TP260. In the course of this, the pH changed only marginally, if at all. Subsequently, the acidic aqueous alkali metal silicate solution was poured over a previously regenerated mixed bed ion exchanger (60% by weight of strongly acidic LEWATIT® MonoPlus S100 and 40% by weight of strongly basic LEWATIT® MonoPlus M600). With the main fraction, an aqueous silica solution with a pH in the range from 3 to 5 was obtained. The first fraction and the final fraction were discarded.

The aqueous silica solution obtained was concentrated to dryness in a quartz flask and then trace-analysed as described by means of HR-ICPMS. The contents of some relevant elements determined, based on the solid state, are listed in table 9.

TABLE 9

Impurity profile of the aqueous silica solution based on the proportion of dissolved solids

| Element | Al | Ba | Mg | P | Ti | Zr |
|---|---|---|---|---|---|---|
| Content/ppm | 1.5 | 0.23 | 3.1 | 0.04 | 1.3 | 0.67 |

Example 9

By dilution of concentrated sulphuric acid (95-97% by weight) with demineralized water, 4685 g of a dilute aqueous sulphuric acid solution (10.3% by weight) were prepared, and 32 g of hydrogen peroxide (35% by weight) were added to this solution. The resulting solution was then mixed continuously with waterglass (Cognis) of $SiO_2$ concentration 12% by weight by means of a Cavitron® reaction mixer. The volume flow rate for the waterglass metering was 23.1 l/h, and that for the sulphuric acid metering 17.5 l/h. The mixer was operated here with a frequency of 150 Hz. The acidic (pH≤1) aqueous alkali metal silicate solution obtained, which had a yellow-orange colour, was then poured over the chelating ion exchanger LEWATIT® TP260. In the course of this, the pH changed only marginally, if at all. Subsequently, the acidic aqueous alkali metal silicate solution was poured over a previously regenerated mixed bed ion exchanger (50% by weight of strongly acidic LEWATIT® MonoPlus S100 and 50% by weight of strongly basic LEWATIT® MonoPlus M600). With the main fraction, an aqueous silica solution with a pH in the range from 3 to 5 was obtained. The first fraction and the final fraction were discarded.

The aqueous silica solution obtained was concentrated to dryness in a quartz flask and then trace-analysed as described by means of HR-ICPMS. The contents of some relevant elements determined, based on the solid state, are listed in table 10.

TABLE 10

Impurity profile of the aqueous silica solution based on the proportion of dissolved solids

| Element | Al | Ba | Mg | P | Ti | Zr |
|---|---|---|---|---|---|---|
| Content/ppm | 1.7 | 0.93 | 1.7 | 0.03 | 1.4 | 0.89 |

Example 10

By dilution of concentrated sulphuric acid (95-97% by weight) with demineralized water, 7649 g of a dilute aqueous sulphuric acid solution (8.4% by weight) were prepared, and 48 g of hydrogen peroxide (35% by weight) were added to this solution. The resulting solution was then mixed continuously with waterglass (Cognis) of $SiO_2$ concentration 11% by weight by means of a static mixer. The volume flow rate for the waterglass metering was 18.1 l/h, and that for the sulphuric acid metering 16 l/h. The acidic (pH≤1) aqueous alkali metal silicate solution obtained, which had a yellow-orange colour, was then poured over the chelating ion exchanger LEWATIT® TP260. In the course of this, the pH changed only marginally, if at all. Subsequently, the acidic aqueous alkali metal silicate solution was poured over a previously regenerated mixed bed ion exchanger (60% by weight of strongly acidic LEWATIT® MonoPlus S100 and 40% by weight of strongly basic LEWATIT® MonoPlus M600). With the main fraction, an aqueous silica solution with a pH in the range from 3 to 5 was obtained. The first fraction and the final fraction were discarded.

The aqueous silica solution obtained was concentrated to dryness in a quartz flask and then trace-analysed as described by means of HR-ICPMS. The contents of some relevant elements determined, based on the solid state, are listed in table 11.

TABLE 11

Impurity profile of the aqueous silica solution based on the proportion of dissolved solids

| Element | Al | Ba | Mg | P | Ti | Zr |
|---|---|---|---|---|---|---|
| Content/ppm | 2.1 | 1.7 | 1.3 | 0.42 | 1.5 | 0.56 |

Example 11

A dilute sulphuric acid solution (8.4% by weight) was mixed continuously by means of a static mixer with a waterglass solution (Cognis) with an $SiO_2$ concentration of 11% by weight, with a volume flow rate for the waterglass metering of 18.1 l/h and for the sulphuric acid metering of 16 l/h. The resulting acidic (pH≤1) aqueous alkali metal silicate solution, which was clear and colourless, was then poured over the chelating ion exchanger LEWATIT® TP260. In the course of this, the pH changed only marginally, if at all. Subsequently, the acidic aqueous alkali metal silicate solution was poured over a previously regenerated mixed bed ion exchanger (50% by weight of strongly acidic LEWATIT® MonoPlus S100 and 50% by weight of strongly basic LEWATIT® MonoPlus M600). With the main fraction, an aqueous silica solution with a pH in the range from 3 to 5 was obtained. The first fraction and the final fraction were discarded.

The aqueous silica solution obtained was concentrated to dryness in a quartz flask and then trace-analysed as described by means of HR-ICPMS. The contents of some relevant elements determined, based on the solid state, are listed in table 12.

TABLE 12

Impurity profile of the aqueous silica solution based on the proportion of dissolved solids

| Element | Al | Ba | Mg | P | Ti | Zr |
|---|---|---|---|---|---|---|
| Content/ppm | 1.8 | 1.7 | 3.6 | 0.14 | 2.4 | 0.58 |

Examples 12-18

The high-purity aqueous silica solutions obtained from examples 1, 2 and 4 and 8-11 were each adjusted to a pH in the range from 8 to 10.5 by adding aqueous potassium hydroxide solution and heated to 90° C. At this temperature, further high-purity aqueous silica solution and potassium hydroxide solution were then supplied in a constant ratio which enables the maintenance of a pH in the range from 8 to 10.5. The colloidal silica sols formed were subsequently concentrated by means of ultrafiltration.

Trace analysis by means of HR-ICPMS after concentration to dryness in a quartz flask showed that the resulting colloidal silica sols had impurity profiles which, within the bounds of experimental measurement certainty, corresponded to those of the underlying high-purity aqueous silica solution (tables 2, 3, 5, 9-12). These aqueous colloidal silica sols are correspondingly very suitable for CMP applications.

The invention claimed is:
1. A process for preparing an aqueous colloidal silica sol, the process comprising the following steps:
   a. Preparing an acidic aqueous alkali metal silicate solution with a pH of less than 2 by mixing a water-soluble alkali metal silicate or an aqueous alkali metal silicate solution with an acidifier, wherein the concentration of the alkali metal silicate in the acidic aqueous alkali metal silicate solution is 1 to 8% by weight (based on the $SiO_2$ content), and wherein the weight ratio between the alkali metal silicate (based on the $SiO_2$ content) and the acidifier in the acidic aqueous metal silicate solution is within a range from 0.4 to 40, and contacting the acidic aqueous alkali metal silicate solution with a resin containing one or more chelate-forming functional groups selected from the group consisting of phosphonic acid groups, substituted or unsubstituted amino phosphonic acid groups, sulphonic acid groups, and carboxyl groups, wherein the chelate-forming functional groups have binding affinity to divalent or higher-valency metal ions;

b. Contacting the acidic alkali metal silicate solution from process step a) with a basic anion exchange resin of the hydroxyl type and an acidic cation exchange resin of the hydrogen type in any sequence, the anion exchange resin and the cation exchange resin being used in spatial separation or in a mixture; and c. Forming a stable colloidal silica sol by establishing a temperature, concentration and pH suitable for nucleation and particle growth in the aqueous silica solution obtained from step b).

2. The process for preparing an aqueous colloidal silica sol according to claim 1, wherein the acidic alkali metal silicate solution obtained from process step a) is aged at a temperature in the range from 10 to 100° C. for a period of 0 to 48 h.

3. The process for preparing an aqueous colloidal silica sol according to claim 1, wherein the acidifier is initially charged in step a) and the water-soluble alkali metal silicate or the aqueous alkali metal silicate solution is added.

4. The process for preparing an aqueous colloidal silica sol according to claim 1, wherein the mixing in step a) is effected by means of a static or dynamic mixer.

5. The process for preparing an aqueous colloidal silica sol according to claim 1, in which the water-soluble alkali metal silicate is a sodium waterglass or potassium waterglass with a molar ratio of $SiO_2/A_2O$ (A: Na or K) of 4.5 to 1.5.

6. The process for preparing an aqueous colloidal silica sol according to claim 1, wherein the acidifier comprises one or more acids selected from the group consisting of hydrochloric acid, phosphoric acid, nitric acid, sulphuric acid, chlorosulphonic acid, sulphuryl chloride and perchloric acid.

7. The process for preparing an aqueous colloidal silica sol according to claim 1, wherein the acidic aqueous solution of a water-soluble alkali metal silicate comprises hydrogen peroxide.

8. The process for preparing an aqueous colloidal silica sol according to claim 1, wherein the aqueous silica solution obtained after step b) has a pH of 1 to 5.

* * * * *